United States Patent [19]

Alary

[11] Patent Number: 5,206,191
[45] Date of Patent: Apr. 27, 1993

[54] METHOD OF PRODUCING REFRACTORY MATERIALS AND THEIR APPLICATIONS IN THE CASTING OF CORROSIVE ALLOYS

[75] Inventor: Jean A. Alary, Gardanne, France

[73] Assignee: Pechiney Recherche, Courbevoie, France

[21] Appl. No.: 802,300

[22] Filed: Dec. 4, 1991

[30] Foreign Application Priority Data

Dec. 4, 1990 [FR] France ................. 90 15633

[51] Int. Cl.$^5$ ............................... C04B 38/06
[52] U.S. Cl. ........................ 501/83; 501/88; 501/95; 501/128; 501/153; 106/83
[58] Field of Search ................. 501/95, 153, 154, 128, 501/88, 97, 101, 102, 98, 83; 106/38.3; 423/328

[56] References Cited

U.S. PATENT DOCUMENTS

| | | | |
|---|---|---|---|
| 4,349,386 | 9/1982 | Davidovits | 106/85 |
| 4,357,165 | 11/1982 | Helferich et al. | 106/38.5 |
| 4,472,199 | 9/1984 | Davidovits et al. | 106/85 |
| 4,888,311 | 12/1989 | Davidovits et al. | 501/95 |

FOREIGN PATENT DOCUMENTS

WO8303093 9/1983 PCT Int'l Appl.
2149772 6/1985 United Kingdom.

*Primary Examiner*—Mark L. Bell
*Assistant Examiner*—Alan Wright
*Attorney, Agent, or Firm*—Dennison, Meserole, Pollack & Scheiner

[57] ABSTRACT

A method of producing a refractory material of the non-shaped type is disclosed. Refractory aggregates and a binder are mixed ensuring cohesion by chemical bonding. The mixture is shaped and fired. A charge comprising refractory particles of a polymodal granulometric distribution is mixed with a liquid binder consisting of a mixture in an aqueous medium of polysilicate-based mineral polymers and a mineral polymer comprising sialate groups. The paste obtained is shaped and after hardening of the mixture at a temperature between ambient temperature and 200° C., the hardened mixture is brought to a temperature between 200° and 1300° in order to obtain a refractory material having high mechanical properties, high resistance to thermal shock and resistance to chemical corrosion.

26 Claims, No Drawings

METHOD OF PRODUCING REFRACTORY MATERIALS AND THEIR APPLICATIONS IN THE CASTING OF CORROSIVE ALLOYS

FIELD OF THE INVENTION

The invention relates to the field of refractory materials intended to contain a liquid alloy or metal or to come into contact with a liquid alloy or metal whether as linings for smelting or holding furnaces, liquid metal transfer accessories or as moulds or cores used in foundry work. More particularly, the invention relates to refractory materials which offer an improved resistance to corrosion from highly corrosive alloys such as aluminium-lithium alloys in the liquid state.

STATE OF THE ART

In foundry work, the effective life of coatings and linings in contact with liquid metal, at their cost of maintenance or renewal, constitute one of the elements which has the greatest effect on the economy of the process. A refractory material is expected to show the least possible chemical reactivity vis-a-vis the metal or its impurities, a high level of heat-resistance, no macroporosity, sufficient resistance to crushing under heat to be able to withstand compression stresses, a high degree of tenacity in order to oppose fissuring, the lowest possible thermal expansion and the highest possible thermal conductivity in order to be able to withstand thermal shocks.

In fact, the term "refractory material" embraces a very wide range of compositions generally based on inorganic and non-metallic refractory aggregates, more often than not combined by a binder. Therefore, in order the better to relate to the present invention, it is necessary to recall the various criteria of classification of refractory materials which appear for instance in the work "Techniques de l'ingénieur"—A 7300 pages 1 to 18—1986.

The refractory materials may be classified in various ways, for example by the chemical nature of the aggregates and binders, by the end use, by the type of application. This last-mentioned criterion results in the making of a distinction between refractory materials which have been shaped and those which have not: the first will be represented typically by bricks which are then bonded to one another by a joint while the second, those which have not been shaped, are products of the ramming mass or concrete type, for which there has been no shaping prior to the final application. Another criterion is the nature of the bonds which provide for cohesion of the ceramic material: a ceramic bond when hardening is attained by sintering during firing, a hydraulic bond in the case of cements which harden at ambient temperature after being mixed with water, a chemical bond when hardening is the result of a chemical reaction of a generally mineral non-hydraulic binder such as a silicate, at a temperature which may be ambient temperature, and finally an organic bond based on carbon-containing binders of the tar, pitch or resin type.

In the field of the invention, there are both shaped and also non-shaped materials with ceramic or hydraulic or chemical bonding.

OBJECT OF THE INVENTION

With the perfection of corrosive alloys in the liquid state, particularly aluminium and lithium alloys, referred to hereinafter in this application by the abbreviation Al-Li, the conventional refractory materials have demonstrated inadequate corrosion-resistance, so that they frequently need to be changed, calling for considerable extra operating costs. The refractory materials known to date and acceptable at economic level have not proved to be entirely satisfactory and therefore the Applicants have looked for a solution to this problem. It is well known to the man skilled in the art that the weakness with shaped refractory materials is the joint and therefore the Applicants have for this reason and also because the non-shaped refractory materials inherently have considerable flexibility in use, sought a solution to the problem posed in the field of non-shaped refractories.

The object of the invention is a method of producing a refractory material which permits of prolonged contact with a metal or an alloy in the liquid state, particularly an alloy of Al-Li, and its application either as a coating, generally as an inner lining of a furnace, spout, or all or part of the equipment with which the liquid metal may come into contact during the course of processing, transformation, or as a refractory material shaped into an object, particularly a casting mould, a permanent or other mould, tube, panel etc.

DESCRIPTION OF THE INVENTION

According to the invention, the method of producing a refractory material of the non-shaped type comprises the mixture of refractory aggregates and a binder to ensure cohesion by chemical bonding, the shaping of this mixture and its firing, and is characterised in that:

at a temperature comprised between the ambient temperature and 200° C., a charge comprising refractory aggregates constituted by refractory particles which have a polymodal granular metric distribution is mixed with a liquid alkaline binder consisting of a mixture of polysilicate-based mineral polymers and a mineral polymer comprising sialate groups ($-Si-O-O-AlO-O-$)$-M^+$ in an aqueous medium, M designating an alkaline metal, and the mixture is blended in order to distribute the binder uniformly throughout the charge and in order to form an homogeneous paste, the paste obtained is shaped and after the mixture has hardened at a temperature comprised between ambient temperature and 200° C., the hardened mixture is brought to a temperature comprised between 200° and 1300° C. in order to obtain a refractory material of high mechanical properties, a high resistance to thermal shock and to chemical corrosion.

Faced with the problem posed by the aggressive nature of alumium alloys in the liquid state, particularly the Al-Li alloys, the Applicants having observed that the refractory aggregates and binders normally used in foundry work underwent considerable corrosion tested a large number of mixtures of refractory aggregates and mineral binders and were surprised to find that a binder containing sialate groups ($-Si-O-AlO-O-$)$-M^+$, in conjunction with certain particular refractory aggregates, made it possible to produce a refractory material simultaneously invested with mechanical characteristics, resistance to thermal shock and resistance to corrosion all of which were markedly superior to those of prior art refractory materials.

Such a binder containing sialate groups, described and designated by PS for polysialate in French Utility Model Certificate No. 2 489 291, is already known to yield, by mixture with possibly refractory mineral charges, moulded objects which have the qualities of ceramics, particularly excellent thermal and dimensional stability, but these properties in themselves did not make it possible to foresee any possible way of simultaneously obtaining the properties of the refractory materials according to the invention, particularly an improved resistance to corrosion in the presence of a liquid metal, particularly a corrosive liquid metal such as an alloy of Al-Li.

According to the invention, another binder containing sialate groups and siloxo groups (—Si—O—O—AlO—O—SiO—O—)—M+ may be equally suitable, M being an alkaline metal. Such a binder is described in French Patent Application No. 2 464 227 and it is designated PSS, for poly(sialate-siloxo). These binders may also contain alkaline metal polysilicates so that the overall composition of the binder according to the invention, at the stage of being mixed with aggregates prior to the departure of water molecules, satisfies the following relationships (molar ratios) if the alkaline metal is potassium, but the transposition is easy in the case of any other alkaline metal:

| | |
|---|---|
| $K_2O/SiO_2$ | comprised between 0.20 and 0.40 |
| $SiO_2/Al_2O_3$ | comprised between 3.5 and 4.5 |
| $H_2O/Al_2O_3$ | comprised between 14 and 20. |

At the stage of being mixed with the aggregates, these binders are reactive liquid dispersions so that the period during which they can be used is limited and is a function of the temperature, for example a PS-based binder will have an effective pot life of 24 hours at 25° C. These reactive binders are themselves obtained by a mixture, at the moment of use, of two inert components taken separately. Certain of these binders are marketed under the registered trade mark Géopolymite R.

According to the invention, the refractory aggregates are chosen from magnesium aluminate, silicon carbide, silicon nitride, electrofused magnesium oxide, white or brown corundum, globular corundum, alumina, zirconium, titanium oxide, silica, chromium oxide, carbon and graphite, rare earth oxides, particularly yttrium oxide $Y_2O_3$. The refractory aggregates are generally used in the form of powder but these materials may also be used in the form of fibrils or trychites. Preferably, magnesium aluminate is used.

The ratio of "charge":"binder" by weight is comprised between 1 and 10. Preferably it is between 3 (mixture 75/25) and 9 (mixture 90/10). In fact, in order to obtain an homogenous mixture and a total wetting of the mineral charge by the binder, it is necessary to have effective mixing and therefore it is essential for the mixture of the mineral charge with the binder to have a suitable viscosity: the acceptable fluidity limit corresponds to a weight ratio of 1 while the acceptable viscosity limit corresponds to a weight ratio of 9. Furthermore, the binder is known as generally being the weak point of the refractory material, more sensitive than the refractory aggregate to chemical corrosion so that normally it is not desirable to have a binder level which exceeds the level needed for operation, that is to say which allows the preparation of an homogeneous paste, so that a ratio close to 5 is often a good compromise.

The mean particular size of the refractory aggregates is between 2 mm and 0.1 µm and their granular metric distribution is polymodal, that is to say it has at least two principal maxima such as is apparent if one traces the histogram yielding the mass or volume fraction as a function of the particular size.

Thus, according to the invention, in order to have a refractory material having high mechanical properties, it is favourable to have a granular metric distribution in the charge of refractory aggregates such that there is a bimodal distribution with at least 50% by weight of the charge of a particular size greater than 800 µm and with at least 20% by weight of the charge with a particular size less than 400 µm. Thus, it is favourable to have within the granular metric range from 400 to 800 µm a fraction which represents less than 30% by weight of the entire charge.

The proportions of each granular metric fraction are determined either empirically or by calculation to optimise compactness. Such a distribution makes it possible to obtain a refractory material with an optimum pore volume, generally comprised between 0.05 and 0.1 cc/g (measured using a mercury porosimeter). Indeed, the Applicants have noted that a sufficiently low pore volume was necessary to obtain a sufficiently high mechanical strength but that furthermore a fairly high pore volume was needed to obtain sufficient resistance to thermal shock.

According to the invention, it is advantageous, particularly in order to reinforce the mechanical properties, to replace a granular metric fraction of the refractory aggregate charge by one or a plurality of other refractory aggregate charges of a different chemical nature but substantially of the same granulometry in order to retain overall the initial optimum volumetric granulometry.

Thus, particularly in the case of magnesium aluminate, it was found advantageous to replace the lower granular metric fraction at 800 µm by particles of silicon carbide or globular corundum with a closely related granulometry or by particles of globular corundum and magnesium oxide (granulometry less than 800 µm).

The Applicants have also observed that it might be advantageous to incorporate into the refractory aggregate charge non-refractory additives, the proportion by weight of refractory aggregates always having to be at least 75% of the total charge.

According to the invention, it is possible to incorporate into the aggregate refractory charge mineral additives aimed at improving the properties of the final refractory product, particularly its mechanical properties. Thus, it was found advantageous to incorporate into the charge 1 to 10% by weight of a boronic derivative such as Sogébor C (registered trade mark) and preferably from 3 to 6%.

Furthermore, in order to control and in particular increase the porosity of the finished refractory material, it is possible to introduce into the charge a porogenous agent which may consist of a thermodegradable material. For example, the addition of a thermodegradable material such as sawdust, to the charge of refractory aggregates modifies the porosity and considerably improves the resistance to thermal shock. It is possible to incorporate up to 5% by weight and preferably 1 to 3% by weight of porogenous agent.

With a similar aim, the Applicants found it interesting to incorporate a charge consisting of hollow particles (closed hollow spheres), for example globular corundum, in order to increase the closed porosity and therefore the resistance to thermal shock, without increasing the open porosity which tends to diminish the mechanical strength properties and the resistance to corrosion by infiltration of liquid alloy into the open pores. Typically, 10 to 30% by weight of a refractory charge and in particular the granular metric fraction smaller than 400 μm is replaced by refractory hollow particles of the same granular distribution (less than 400 μm), and an improvement is observed in the properties as previously indicated.

According to the invention, the binder in liquid form and all the possible additives and the mineral charge consisting of a mixture of powders varying in granulometry and chemical nature as already mentioned, are mixed together to form a paste using any known apparatus which can ensure paste preparation and the intimate mixing of a powder and a liquid. Such apparatus may be mixers used for the production of inks, paints, for bread manufacture, or they may be appliances of the concrete mixer type, appliances ensuring continuos mixing using a single or double screw with in this case a possibility of continuously extruding a refractory material having the desired form, typically a sheet or a tube.

According to a particular embodiment of the invention, the starting constituents of the refractory material are mixed and shaped continuously by means of an extruder and are then hardened by heating at the extruder output in order to provide for instance sheets or tubes of refractory material.

According to the efficiency of the mixing, so it may last from a few minutes to several dozen minutes. As the binder is at this stage a reactive product as already announced, the paste obtained by mixing must be used before the binder hardens: either as a coating mass and protecting the equipment in contact with the alloys in the liquid state, essentially the furnaces, the ducting, transverse bouts, or as a "modelling paste" for producing objects of refractory material, for example by moulding, extrusion or injection. The rate of hardening of the paste depends on the temperature and ranges from about 15 hours at ambient temperature to about one hour at around 85° C. Hardening is carried out without shrinkage and without cracking.

After shaping and hardening of the paste at a temperature which may range from ambient temperature to 200° C., the refractory material is brought to a temperature comprised between 200° and 1300° C. in order to reinforce its mechanical properties. In the case of a ramming mixture, heating is carried out by means of burners.

In the case of the production of objects, for example moulded objects, the rate of temperature rise is controlled and is comprised between 50° and 200° C. per hour. Preferably, the temperature rises with stages at intermediate temperatures.

The Applicants were surprised to find that the refractory materials obtained according to the invention displayed better mechanical performance and better resistance to corrosion than the materials currently used in foundry work according to the prior art, particularly in cases where the liquid alloy is an alloy of Al-Li. With the refractory materials of the invention, the period of operation of a furnace between two restoration operations was virtually doubled, which is a vital point with regard to economy.

The Applicants have advanced an hypothesis to explain the surprising behaviour of the refractory materials obtained according to the invention: the pore volume of materials obtained according to the invention is around 0.05 cc/g, in other words approx. 20 times less than that of the prior art material (control material=0.1145 cc/g), so that there is reason to think that the considerable reduction in pore volume reduces by just as much the penetration of the liquid metal into the material under the effect of the metallostatic pressure of the alloy, and so in the final analysis reduces the risks of corrosion.

Another advantage of the invention, of great practical importance, is the ease with which the paste obtained according to the invention can be used in order to form a ramming mixture. Indeed, a prior art mixture, for example the magnesium aluminate-based mixture marketed under reference LS 964 by Norton, is applied by being rammed dry onto the surface to be protected, the ramming mixture being held against the surface to be protected, by means of a metallic counter-mould. Then the counter-mould is raised to about 600° C. to heat the ramming mixture and impart a certain mechanical strength to it allowing the counter-mould to be withdrawn without the ramming mixture collapsing. After withdrawal of the counter-mould, the ramming mixture is raised to about 1200° C. by being heated with a burner.

The ramming mixture according to the invention may be used without a counter-mould, in the same way as a mortar or a plaster is applied to a wall, which is extremely convenient and practical. After hardening at a relatively low temperature, the ramming mixture is raised to about 1100° C. by being heated with a burner.

Another advantage of the invention is the possibility of successively applying several layers of ramming mixture with or without intermediate heating at 1100° C. Indeed, it is particularly interesting to produce a ramming mixture in two layers with an undercoat (that which is in contact with the wall to be protected) which is relatively porous and therefore capable of withstanding numerous thermal shocks, and with an outer layer or topcoat (that which is in contact with the liquid metal) which is relatively far less porous.

Finally, another advantage of the invention is the polyvalency of usage which makes it possible to be able to produce from the same materials protective ramming masses and sundry objects which may come in contact with a liquid metal which may possibly be highly corrosive.

EXAMPLES

Examples 1 to 7

On a basis of various samples of magnesium aluminate (supplier: Péchiney Electrométallurgie), a charge was prepared having the following granulometry:

| | |
|---|---|
| >1000 μm | 52% by weight |
| 400–1000 μm | 4% by weight |
| 100–400 μm | 15% by weight |
| <100 μm | 29% by weight |

This granulometry was chosen after orientation tests.

In a 3 liter mixer, an homogeneous pasty mixture of magnesium aluminate and Géopolymite GP 70 binder (registered trade mark), a PS type binder, was prepared by mixing at ambient temperature for 30 minutes, the constituents being in variable proportions expressed by the ratio CH:GP in which CH designates the mass of magnesium aluminate and GP the mass of binder expressed as dry product.

With a view to characterising the refractory material, briquettes were then moulded having dimensions of 120×60×20 mm and these were hardened by being raised to 150° C. for 1 hour. The mould was removed and the briquettes were then raised to a temperature T (°C) at a rate of rise equal to 150° C. per hour. A stage of 1 hour was observed at a stage temperature T. After return to ambient temperature, the density d was measured and the pore volume Vp, using a mercury porosimeter (the measured density is therefore a "skeletal" density, the mercury penetrating all the open pores), the rupture stress Rm (3 point flexion) of each refractory material being ascertained from specimens measuring 120×20×20 mm. In this series of tests, the resistance to corrosion was evaluated by immersing briquettes in an Al-Li bath at 750° C. for 72 hours and examining crosscuts to determine the depth of penetration of the alloy.

As a control sample (Example 7) corresponding to the prior art, a ramming mass LS 964 based on magnesium aluminate (supplier: Norton) was used. For purposes of comparison, this ramming mass was compressed in a metal mould and raised to 600° C. and maintained at this temperature for 12 hours. Cohesion of the ramming mass then being sufficient, the metal mould was removed and the resultant briquette raised to 1100° C. for 1 hour.

The results obtained are shown in the following table:

| Test No. | CH/JT | T(°C.) | d | Vp cc/g | Rm MPa | Penetration by Al-Li |
|---|---|---|---|---|---|---|
| 1 | 85/15 | 1100 | 2.816 | 0.0364 | 8.04 | 2.5 mm |
| 2 | 70/30 | 1100 | 2.692 | 0.0490 | 10.40 | 3 mm |
| 3 | 80/20 | 700 | 3.063 | 0.0603 | 5.95 | 4.5 mm |
| 4 | 80/20 | 1100 | 2.820 | 0.0410 | 13.22 | 3 mm |
| 5 | 85/15 | 700 | 3.009 | 0.0618 | 7.66 | 4.5 mm |
| 6 | 70/30 | 700 | 2.819 | 0.0875 | 6.62 | 5 mm |
| 7 control | | 1100 | 2.370 | 0.1145 | 4.82 | 8 mm |

Examples 8 to 11

In these examples, similar to the preceding tests, the granulometric fraction below 100 μm of the magnesium aluminate used in Examples 1 to 7 was replaced by silicon carbide of the same granulometry but varying not only the CH:GP ratio and T but also the proportion by weight of silicon carbide SiC in the magnesium aluminate.

The results obtained appear in the following table:

| Test No. | CH/GP | SiC % | T(°C.) | d | Vp | Rm | Penetration by Al-Li |
|---|---|---|---|---|---|---|---|
| 8 | 83/17 | 5.7 | 700 | 2.828 | 0.0560 | 9.04 | 4 mm |
| 9 | 76/24 | 14.3 | 700 | 2.755 | 0.0571 | 7.68 | 3.5 mm |
| 10 | 83/17 | 11.4 | 1027 | 2.918 | 0.0238 | 18.04 | 3 mm |
| 11 | 76/24 | 11.4 | 1027 | 2.663 | 0.0635 | 11.62 | 3.5 mm |

Examples 12 to 14

In these examples, as with the series of tests 1 to 7, a boronic mineral additive Sogébor C (registered trade mark of Sogérem) was added to the magnesium aluminate, the whole constituting the total charge CH. The tests were different by reason of the Sogébor C content of the charge CH and by the ratio CH:GP. The temperature T is the same for all the tests and is 950° C.

The results obtained appear in the following table:

| Test No. | CH:GP | % Sogébor C of total CH | Rm (MPa) | Penetration by Al-Li |
|---|---|---|---|---|
| 12 | 5.66 | 3 | 28.45 | 2.5 mm |
| 13 | 4 | 0.4 | 17.60 | 3 mm |
| 14 | 4 | 3.8 | 25.86 | 2.5 mm |

Example 15

The magnesium aluminate was replaced by brown corundum in a test similar to the test series nos. 12 to 14:
The results obtained appear in the following table:

| Test No. | CH:GP | % Sogébor C of total CH | Rm (MPa) | Penetration by Al-Li |
|---|---|---|---|---|
| 15 | 2.33 | 6 | 10.41 | 3.5 mm |

Examples 16 to 18

In these tests, the resistance to thermal shock and the influence of a porogenous agent such as sawdust were studied.

For this, cylindrical samples 50 mm in diameter and 50 mm high and of the following composition were prepared:

| Test No. | CH:GP | % Sogébor C of total CH | % porogenous agent of total CH |
|---|---|---|---|
| 16 | 5.66 | 3% | 0% |
| 17 | 5.66 | 3% | 1% |
| 18 | 5.66 | 3% | 2% |

The thermal shock test consists in following the evolution of the permeability to air of a sample subjected to successive thermal shocks by raising the sample from 20° C. to 720° C. and then steeping it in a mass of water at 20° C. This test is a good way of following the evolution of the refractory material in relation to the formation of microcracks by thermal shock.

The results obtained appear in the following table:

| Test No. | Permeability (in nPerm) after x thermal shocks | | | | | |
|---|---|---|---|---|---|---|
| | x = 0 | 1 | 2 | 3 | 4 | 5 |
| 16 | 106 | 106 | 149 | 183 | 193 | 238(+124%) |
| 17 | 322 | 389 | 423 | 443 | 486 | 569(+76%) |
| 18 | 1955 | 1955 | 2021 | 2021 | 2032 | 2034(+4%) |

With 2% porogenous agent, therefore, a material was obtained which is quite low in sensitivity to thermal shock since the permeability increased by only 4% after 5 thermal shocks.

Tests 19 and 20

In these tests, similar to test 12, globular corundum was incorporated, having been supplied by Péchiney Electrométallurgie, in certain granulometric fractions of the magnesium aluminate (LS 964 from Norton). The CH:GP ratio was fixed at 5.66 and the Sogébor content at 3% of the total charge.

Test 19

The granulometric fraction below 100 μm of this charge, constituting 20.92% by weight of the charge, was replaced by 15.92% by weight of globular corundum and 5% by weight magnesium oxide, the globular corundum and the magnesium oxide having a granulometry of less than 100 μm.

Test 20

The granulometric fraction comprised between 100 and 800 μm constituting 26.62% by weight of the charge, was replaced by globular corundum of substantially the same granulometry, and the granulometric fraction below 100 μm, constituting 2.6% by weight of the charge, was replaced by magnesium oxide of substantially the same granulometry. The temperature T for these two tests was 950° C. Bricks were produced in order to evaluate the mechanical properties, and also crucibles (11 cm outside diameter and 20 cm high by 7 cm inside diameter).

Results

|  | Test 19 | Test 20 |
| --- | --- | --- |
| Rm (MPa) | 6.11 | 10.61 |
| Resistance to corrosion (*) | excellent | excellent |
| Resistance to thermal shock (**) | good | very good |

(*): the resistance to corrosion was evaluated by quantitative analysis of the chemical elements of an aluminum alloy after the alloy had been in the crucible for 72 hours in the liquid state (750° C.).
With a 3004 aluminum alloy (in accordance with IAA standards), no pollution of the alloy by the crucible was observed. With an alloy of Al-Li, a blackening of the crucible was found on the surface, reflecting the formation of LiAlO$_2$ (demonstrated by X-ray defraction).
(**): thermal shock resistance was evaluated by pouring an aluminum alloy (alloy 3004) at 750° C. into the crucible at 20° C. and then performing several rise cycles to 800° and then cooling to ambient temperature. The crucible obtained in test 19 cracked at the second fresh rise in temperature while that of test 20 remained intact after several temperature rises to 800° C. and cooling to ambient temperature.

I claim:

1. A method for producing a refractory material adapted for protection of foundry equipment from contact with liquid metal, comprising the steps of:
    forming a charge, at a temperature between ambient and 200° C., comprising (1) refractory aggregate having a bimodal granulometric distribution in which at least 50% by weight of said aggregate is greater than 800 μm and at least 20% by weight of said aggregate is less than 400 μm, and (2) a liquid alkaline binder including a polysilicate mineral polymer and a sialate mineral polymer of the formula (—SiO—O—AlO—O—)$^-$M$^+$, where M is an alkali metal;
    blending said charge to distribute the binder uniformly throughout and forming a homogeneous paste;
    shaping said paste, and allowing said shaped paste to harden at a temperature between 200° C. and 1300° C. for a time sufficient to improve the mechanical properties and increase the resistance to thermal shock and chemical corrosion of the hardened paste.

2. A method according to claim 1 in which the said binder comprises siloxo and sialate groups (—SiO—O—AlO—O—SiO—O—)$^-$M$^+$, M designating an alkaline metal.

3. A method according to claim 1 in which the ratio by weight of the said charge and of the said binder is comprised between 1:1 and 10:1.

4. A method according to claim 3 in which the ratio by weight of the said charge and of the said binder is comprised between 3:1 and 9:1.

5. A method according to any one of claim 2, 3 or 4 in which said refractory aggregates constitute at least 75% by weight of said mineral charge.

6. A method according to claim 5, in which the said refractory aggregates consist of magnesium aluminate.

7. A method according to claim 5, in which the said refractory aggregates are selected from the group consisting of silicon carbide, silicon nitride, electrofused magnesium oxide, alumina, zirconia titanium oxide, silica, chromium oxide, carbon, graphite, and the rare earth oxides.

8. A method according to claim 5 in which the said refractory aggregates consist of a mixture of at least two refractory aggregates selected from the group consisting of magnesium aluminate, silicon carbide, silicon nitride, electrofused magnesium oxide, alumina, zirconium, titanium oxide, silica, chromium oxide, carbon, graphite, and rare earth oxides.

9. A method according to claim 8 in which the granulometric fraction greater than 800 μm in said mixture is constituted by magnesium aluminate and in which the granulometric fraction below 800 μm in the said mixture is selected from the group consisting of silicon carbide, globular corundum and a mixture of, globular corundum and magnesium oxide.

10. A method according to claim 5, in which the said charge comprises a non-refractory mineral additive to reinforce the mechanical characteristics of the finished refractory material.

11. A method according to claim 10, in which the mineral additive constitutes less than 30% by weight of the said charge.

12. A method according to claim 11 in which the mineral additive is a boronic mineral.

13. A method according to claim 5 in which the said charge contains up to 5% by weight of a porogenous agent.

14. A method according to claim 13, in which the porogenous agent is a thermodegradable material.

15. A method according to claim 14 in which the thermodegradable material is sawdust.

16. A method according to claim 5 in which the paste obtained by mixing and blending the said charge and the said binder is shaped by applying at least one layer of the said paste on a wall to be protected from contact with a liquid metal.

17. A method according to claim 16 in which two layers of said paste are applied, the layers differing in porosity.

18. A method according to claim 17 in which a first layer is applied which results in a refractory material of high porosity after which a second layer of lower porosity is applied in order to obtain an asymmetrical refractory layer, with the surface which is intended to come in contact with the liquid metal being of low porosity.

19. A method according to claim 5, in which the paste obtained by mixing and blending of the said charge and the said binder is shaped by moulding, by extrusion or by injection.

20. A method according to claim 4 in which the ratio by weight of the charge and of the said binder is about 5:1.

21. A method according to claim 7 wherein the rare earth oxide is yttrium oxide.

22. A method according to claim 8 wherein the rare earth oxide is yttrium oxide.

23. A method according to claim 1, wherein said shaping step comprises the manufacture of objects, section members, tubes, or panels of refractory materials.

24. A method according to claim 1, wherein said shaping step comprises application of said paste to a wall which is to be exposed to liquid metal.

25. A method according to claim 7 in which the alumina is selected from the group consisting of white corundum, brown corundum and globular corundum.

26. A method according to claim 8 in which the alumina is selected from the group consisting of white corundum, brown corundum and globular corundum.

* * * * *